(12) United States Patent
Joranlien et al.

(10) Patent No.: US 7,040,801 B2
(45) Date of Patent: May 9, 2006

(54) MIXING APPARATUS WITH NON-CONCENTRIC AUGER

(75) Inventors: Ric Joranlien, Monroe, WI (US); Thierry Krier, Oregon, WI (US)

(73) Assignee: Kuhn Knight Inc., Brodhead, WI (US)

( * ) Notice: Subject to any disclaimer, the term of this patent is extended or adjusted under 35 U.S.C. 154(b) by 195 days.

(21) Appl. No.: 10/767,350

(22) Filed: Jan. 30, 2004

(65) Prior Publication Data

US 2005/0169103 A1    Aug. 4, 2005

(51) Int. Cl.
*B01F 7/24* (2006.01)
(52) U.S. Cl. .................. 366/314; 366/323; 366/603
(58) Field of Classification Search ............... 366/302, 366/306, 307, 314, 603, 318–324, 287; 198/666, 198/668
See application file for complete search history.

(56) References Cited

U.S. PATENT DOCUMENTS

| | | | |
|---|---|---|---|
| 2,830,695 A * | 4/1958 | Fennimore et al. | |
| 3,251,467 A * | 5/1966 | Bakke | |
| 3,252,562 A * | 5/1966 | Brembeck | |
| 3,580,384 A * | 5/1971 | Pingree | |
| 3,721,333 A * | 3/1973 | Boone | |
| 4,989,716 A * | 2/1991 | Stuckey | |
| 5,119,931 A * | 6/1992 | Barenthsen | |
| 5,129,502 A * | 7/1992 | Justice | |
| 5,230,419 A * | 7/1993 | Millard | |
| 5,305,586 A * | 4/1994 | Lundahl et al. | |
| 6,983,902 B1* | 1/2006 | Faccia | 366/314 |
| 2005/0169103 A1* | 8/2005 | Joranlien et al. | 366/323 |

\* cited by examiner

*Primary Examiner*—Charles E. Cooley
(74) *Attorney, Agent, or Firm*—Oblon, Spivak, McClelland, Maier & Neustadt, P.C.

(57) ABSTRACT

A mixing apparatus is disclosed for mixing and discharging livestock feed. The mixer includes a container for the reception of feed, with a floor, and a wall extending away from the floor such that substantially all of the wall is disposed above the floor. The wall and floor define an enclosure for the feed received through the top opening. An auger is disposed within the enclosure, and the auger has an axis of rotation extending substantially vertically through the floor. The auger also includes an upper core which is not concentric with the axis of rotation, so that the flighting and attached knives are closer to the enclosure during one portion of the auger rotation.

20 Claims, 7 Drawing Sheets

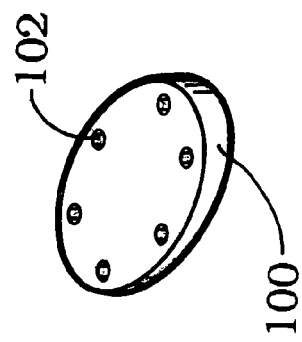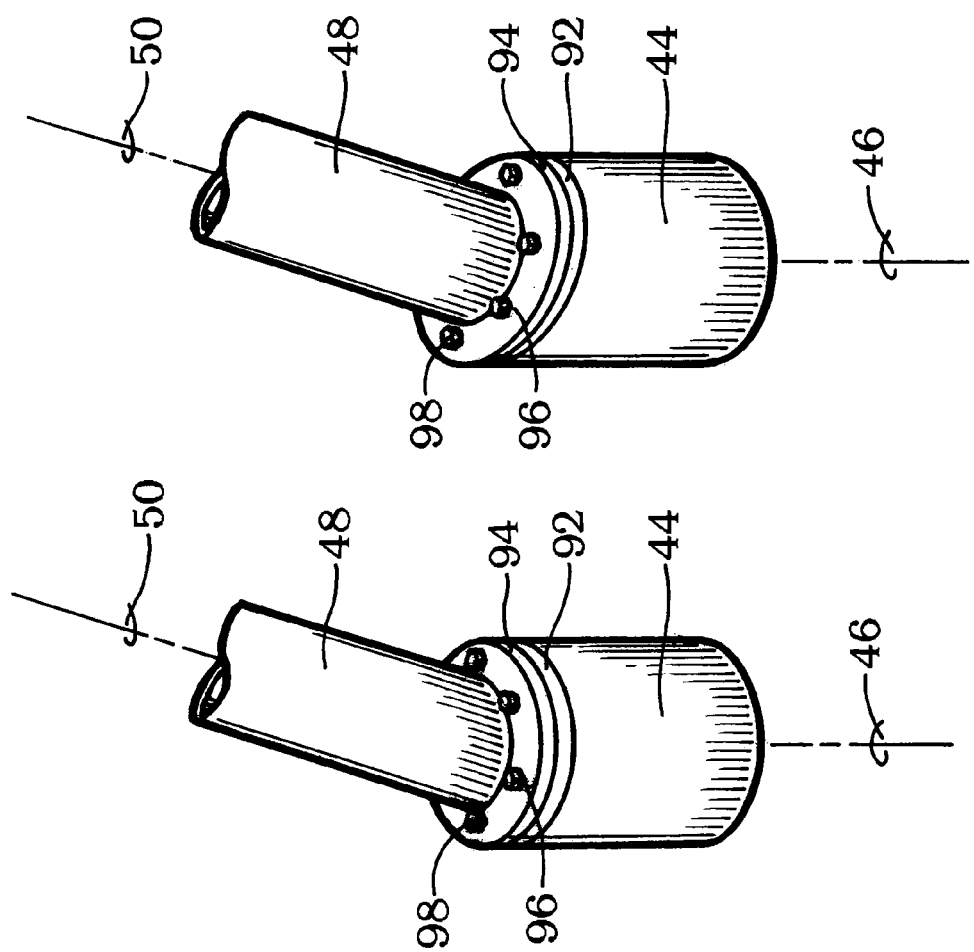

MIXING APPARATUS WITH NON-CONCENTRIC AUGER

CROSS-REFERENCE TO RELATED APPLICATIONS

None

BACKGROUND OF THE INVENTION

1. Field of the Invention

This invention relates to an auger for agricultural mixers, specifically feed mixers having augers that are substantially perpendicular to a plane of a floor.

2. Background of the Invention

Agricultural mixers are used for mixing feed materials such as hay, silage and other nutrients including animal feed supplements and grains. These feed materials are then discharged and fed to various livestock such as cattle and dairy cows. Sometimes the mixing of such feed includes depositing a whole round or square bale of hay into the mixer. The mixer then cuts and processes the bale into the desired consistency before and during the mixing of the other feed nutrients.

In known mixers, there are many different configurations including horizontal augers, reel type arrangements, and vertical augers. In the vertical auger type mixers, the auger and container body designs are generally similar. The container body includes a horizontal floor, which closely approximates the diameter of the vertical auger at its base. Walls extend upward from the floor to form a container with an open top, so that feed materials can be loaded from above.

The walls of the container are in the shape of an inverted frustum, being wider at the top and narrower at the base. However, the walls on the sides of the container are typically arranged at a steeper angle in comparison to the walls on the ends of the container. The reasons for this shape in vertical mixers is both to narrow the overall profile of the container, and to facilitate feed processing inside the mixer. A similar shape is utilized in the case of multiple auger mixers, with the frustum shape being stretched to accommodate the additional augers.

The oblong shape of the vertical mixer container at the top edge, combined with the cone shape of the auger, creates a wide cavity for the reception of feed at the ends of the container, and a somewhat narrower cavity at the sides of the container. During the mixing of feed inside the container, the auger rotates at a constant speed around a vertical axis of rotation, urging the feed materials around the inside circumference of the container. When the feed encounters the narrower cavities at the sides, a restriction point is created, thus forcing a mixing action as well as allowing the auger knives to further cut or process the feed materials. As the feed moves into the wider cavities at the ends of the container, the feed increases in velocity and falls down into the cavity. The resulting rotary motion of the feed is that of alternating restriction and release, slow and fast, rising and falling movement, which causes the mixing and processing of the materials.

The auger design generally consists of a center core on a vertical axis of rotation, with helical auger flighting wrapped around this core. The auger flighting has an overall conical appearance, being wider at the base and narrower at the top. The auger can be described as having a lower core and flighting segment and an upper core and flighting segment. The leading edge of the lower flighting segment extends on a radius from the axis of rotation to closely match the diameter of the floor at the base of the container, in order to engage substantially all the feed material at the floor. The radius distance from the axis of rotation to the outer edge of the lower flighting segment gradually gets shorter as it gets further from the leading edge, generally in the first revolution or "pitch" of the lower flighting segment. Thus, the lower flighting tapers from the bottom toward the top, being wider at the leading edge and narrower at the trailing edge. The trailing edge of the lower flighting segment is positioned adjacent to the leading edge of the upper flighting segment.

The upper flighting segment has a relatively constant radius distance from the axis of rotation to the outer edge of the upper flighting segment, although some taper toward the top of the auger is sometimes utilized. Knives are added to the flighting to help cut and process the feed materials. The flighting segments can also consist of individual paddles or short flighting sections oriented in a helical pattern to urge the material in the desired direction.

A discharge opening is typically located at the lower edge of the container wall to discharge the feed materials after mixing. A door is positioned adjacent to the discharge opening for controlling the flow of feed materials when discharging.

In vertical mixers of typical configuration with augers which are concentric on the axis of rotation, one disadvantage is that in order to facilitate hay processing, the sides must be narrowed to restrict the feed movement adjacent to the auger, thus allowing the knives to process the hay. This narrow gap between the auger flighting and the enclosure at both sides will not allow large bales to fall down further into the mixer at the sides, and thus limits the mixing ability of the apparatus.

Another disadvantage of a concentric auger is that the top of the upper core does not move relative to the enclosure, and thus bales can sit on top of the upper core and fail to descend further into the enclosure.

Another disadvantage of a concentric auger is that the auger flighting remains flat during its movement around the axis of rotation, allowing feed materials to accumulate on top of the flighting even after the discharge of the feed materials.

Another disadvantage of a concentric auger is that the required narrow gaps at the sides reduce the overall volumetric capacity of the mixer enclosure.

Another disadvantage of a concentric auger is that the required narrow gaps at the sides cause materials to spill over both sides, resulting in loss of feed materials.

Another disadvantage of a concentric auger is that additional horsepower is required for the auger knives to cut and process the feed materials on both restrictive sides of the container at the same time.

SUMMARY OF THE INVENTION

Accordingly, one objective of the present invention is to provide a perpendicular mixer auger which addresses at least one of the problems associated with known devices for mixing feed materials. Moreover, depending on the embodiment of the invention, one or more of the capabilities set forth below may be achieved:

providing a mixer with a lower core rotating around the axis of rotation, and an upper core which is not concentric to the axis of rotation. The upper core and its associated auger flighting and knives travel in a wider path around the enclosure, creating a single restriction point on each revolution. The opposite side of the upper core creates a large gap between the auger flighting and the enclosure on each revolution, allowing a large bale to fall down further into the mixer and enhance the mixing action;

providing a mixer with wider sides due to the non-concentric upper core's wider path, allowing an increase in the volumetric capacity of the mixer enclosure;

providing a mixer with a wider gap between the auger flighting and enclosure at the sides, due to the non-concentric upper core's wider path, to reduce the amount of feed spilling over the sides;

providing a mixer where the top of the center core moves in a wider path relative to the enclosure, so that bales cannot sit on top of the center core and fail to descend further into the enclosure;

providing a mixer where the center core and thus the flighting moves in a wider path relative to the enclosure, tipping the flighting to one side and limiting the ability of the feed materials to accumulate on top of the flighting during the discharge of the feed materials;

providing a mixer with a non-concentric upper core to reduce the mixing time required, due to increased feed movement inside the enclosure; and providing a mixer with a non-concentric upper core which processes feed on one side at a time, to reduce the total horsepower required.

BRIEF DESCRIPTION OF THE DRAWINGS

These and other advantages of the invention will become more apparent and more readily appreciated from the following detailed description of the exemplary embodiments of the invention taken in conjunction with the accompanying drawings, where:

FIG. 7A is an isometric view of an alternative non-concentric auger configuration;

FIG. 7B is an isometric view of an alternative non-concentric auger configuration;

FIG. 8 is an isometric view of a core mounting plate shim.

DETAILED DESCRIPTION OF THE DRAWINGS

Figure 1:
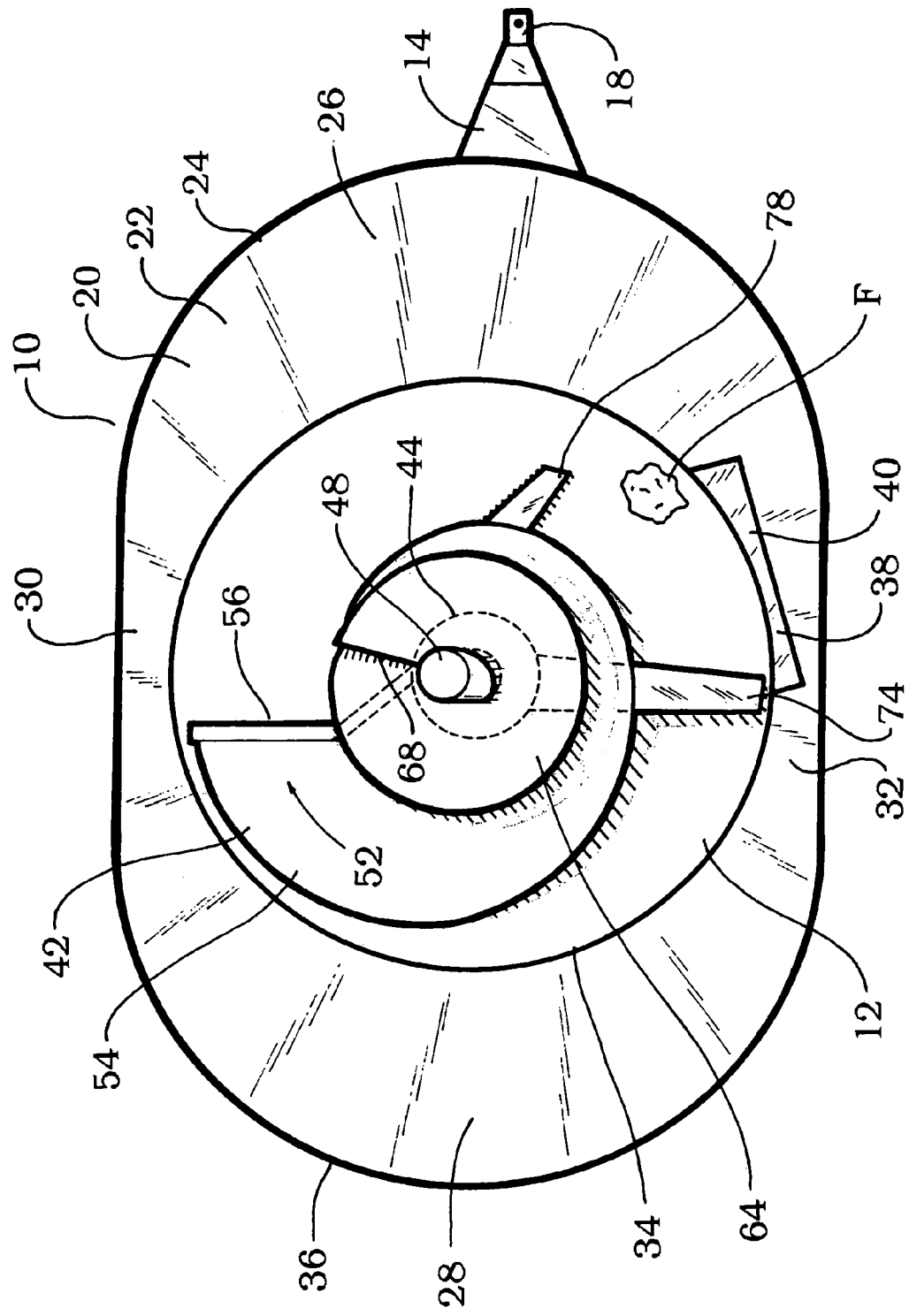
FIG. 1 is a top view of the mixer apparatus.
Figure 2:
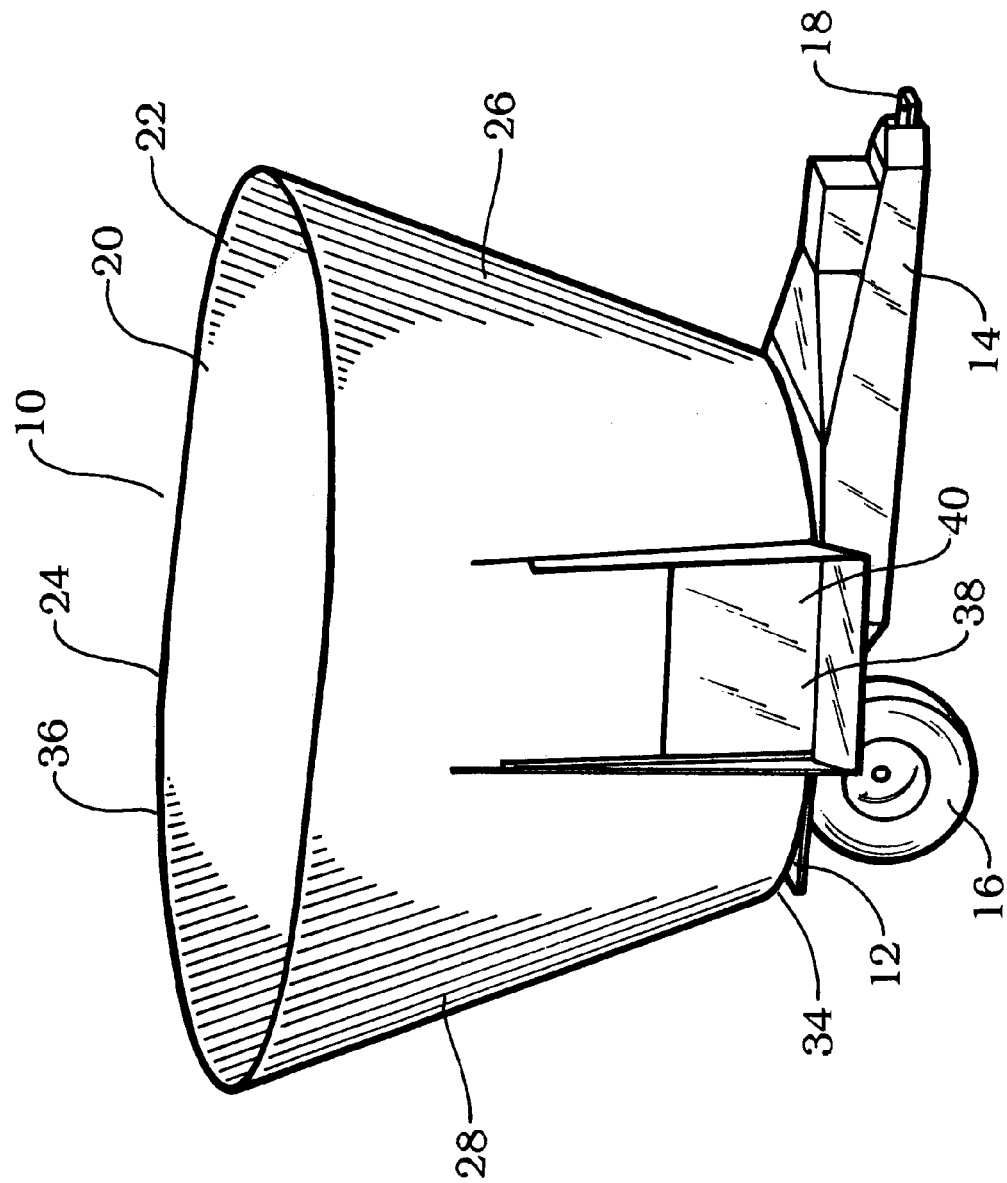
FIG. 2 is a side view of the mixer apparatus.
Figure 3:
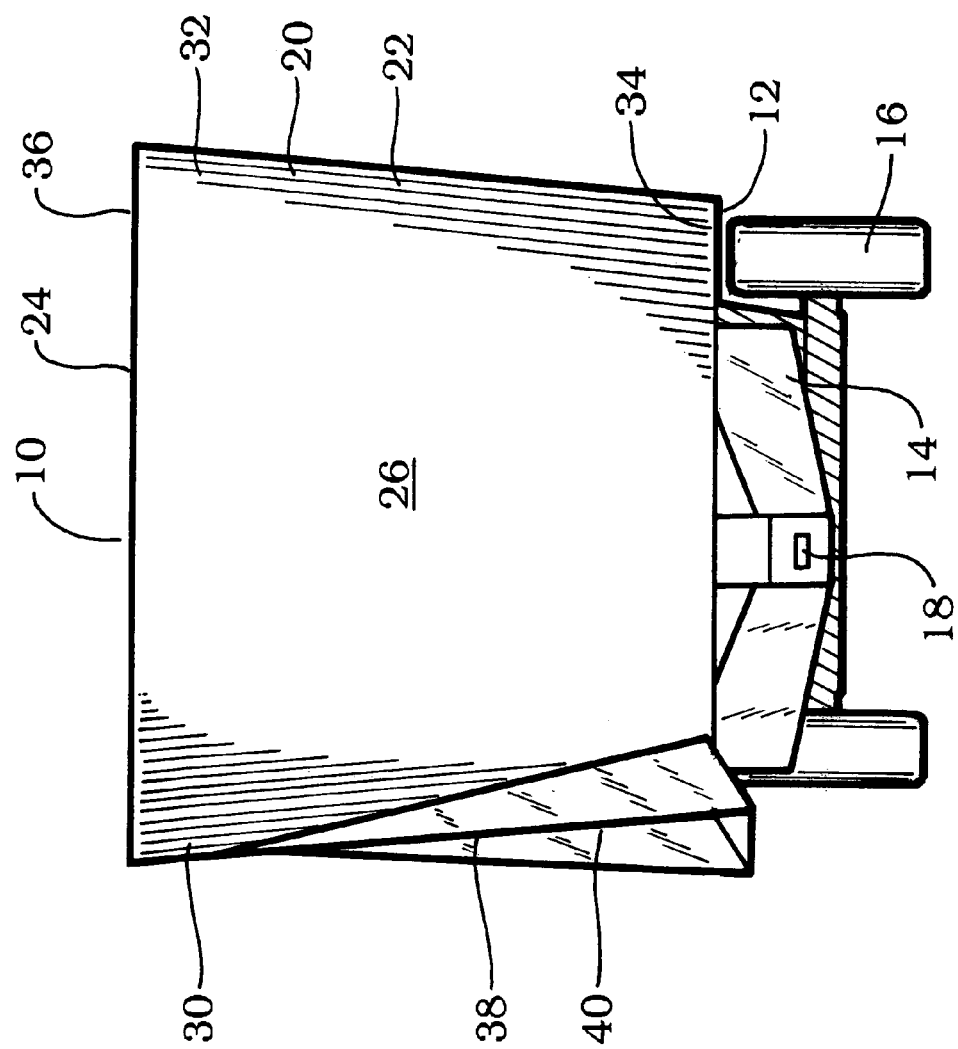
FIG. 3 is a front view of the mixer apparatus.

With reference to FIGS. 1–6, a mixer apparatus is generally designated by the reference number 10. The mixer 10 includes a floor 12 which is attached to an undercarriage 14. The floor 12 may either be parallel to the ground or at an angle thereto. The undercarriage 14 can be mounted in a stationary position or on a truck chassis, but is most often mounted on a set of wheels 16 with a hitch 18 for towing the mixer apparatus. A wall 20 is attached to the floor 12, and extends upward from the floor 12 to form an enclosure 22 for the reception of feed through the top opening 24. The wall 20 includes a first end 26, a second end 28, a first side 30 and a second side 32. The wall 20 also has a bottom edge 34 adjacent to the floor 12, and a top edge 36 adjacent to the top opening 24. A discharge opening 38 is located adjacent to the bottom edge 34 of the wall 20 for discharge of feed materials after mixing. A door 40 is movably positioned adjacent to the discharge opening 38 so that the discharge opening can be closed while mixing and opened for discharging feed materials.

Figure 4:
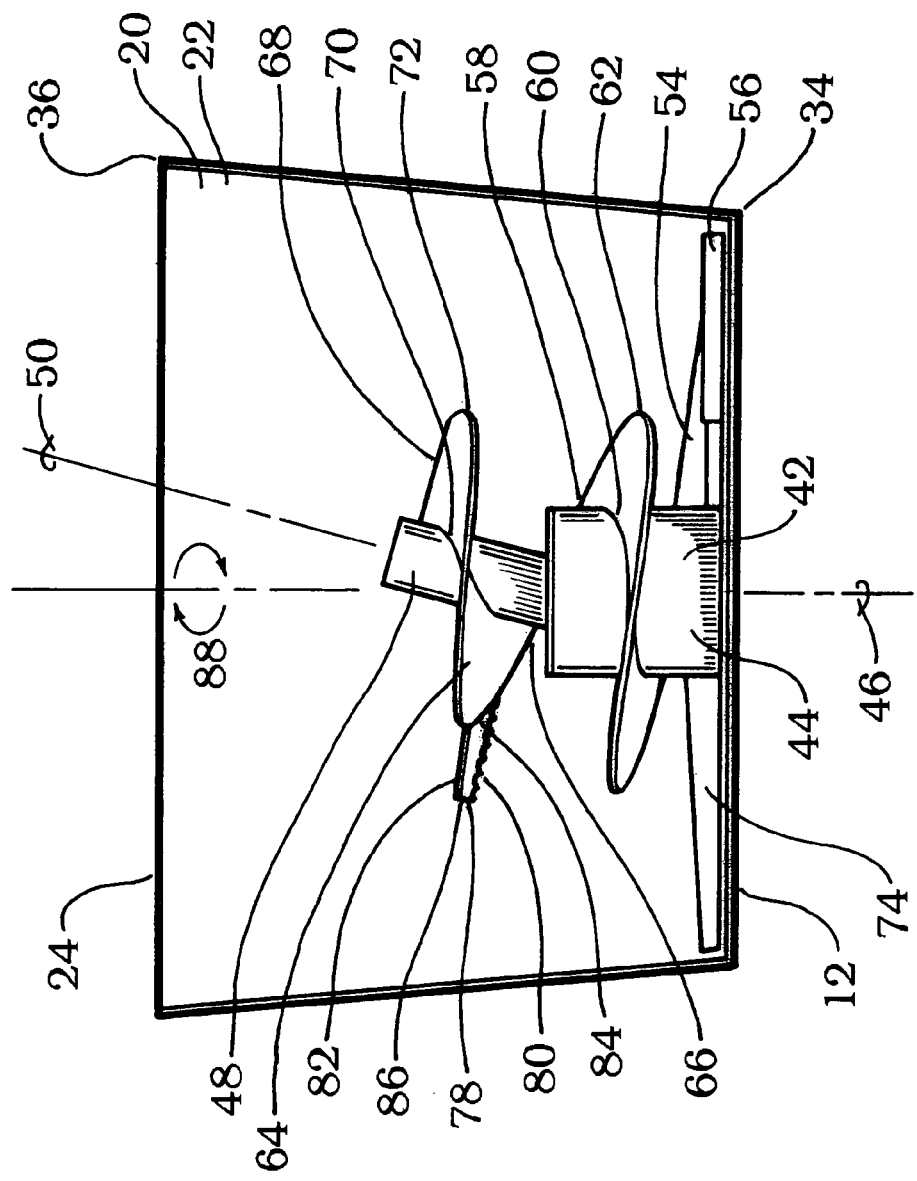
FIG. 4 is a section view of a non-concentric auger configuration.

An auger 42 is positioned inside the enclosure 22 adjacent to the floor 12. In a first embodiment, the auger 42 includes a lower core 44 with an axis of rotation 46 extending approximately perpendicular through the floor 12. However, as the floor need not be parallel with the ground, such axis of rotation may not be substantially vertical while still being substantially perpendicular to a plane of floor. The lower core 44 is shown at substantial length to house a gearbox (not shown), however the lower core could also be very short in length, consisting essentially of the gearbox output shaft. In the embodiment of FIG. 4, the auger 42 also includes an upper core 48 which is adjacent and above the lower core 44. The upper core 48 has a centerline 50 which is located longitudinally through the center of the upper core 48. The auger 42 can be rotated around the axis of rotation 46 in the direction of rotation 52 with a tractor vehicle by means of transmission shafts and gear wheels (not shown) located under the floor 12.

The auger 42 also includes a lower flighting segment 54 attached to the lower core 44 in a spiral configuration. The lower flighting segment 54 has a leading edge 56 adjacent to the floor 12, a trailing edge 58 at the opposite end of the lower flighting segment 54, an inner edge 60 adjacent and attached to the lower core 44, and an outer edge 62 adjacent to the wall 20 of the enclosure 22. The auger 42 also includes an upper flighting segment 64 attached to the upper core 48. The upper flighting segment 64 has a further leading edge 66 adjacent to the trailing edge 58 of the lower flighting segment 54, a further trailing edge 68 at the opposite end of the upper flighting segment 64, a further inner edge 70 adjacent and attached to the upper core 48, and a further outer edge 72 adjacent to the wall 20 of the enclosure 22. The lower flighting segment 54 is typically larger in diameter than the upper flighting segment 64, so that the overall shape of the auger 42 is conical, being wider at the bottom edge 34 of the of the wall 20 and narrower toward the top edge 36 of the wall 20. The lower flighting segment 54 may also include a paddle 74 which assists in feed movement.

The upper flighting segment 64 and lower flighting segment 54 include a plurality of knives 78 which cooperate with the wall 20 to cut and process the feed material. The knives 78 include a cutting edge 80 which is generally positioned forward in the direction of rotation 52 of the auger 42, and a dull edge 82 which is generally positioned rearward in the direction of rotation 52 of the auger 42. The knives 78 also include an inner side 84 which is adjacent to the lower flighting segment 54 or upper flighting segment 64, and an outer side 86 which is closest to the wall 20 of the enclosure 22.

In the embodiment shown in FIGS. 1 and 4, the centerline 50 of the upper core 48 is angled from the axis of rotation 46 of the lower core 44. As the auger 42 rotates around the axis of rotation 46 in the direction of rotation 52, the top of the upper core 48 will travel in a circular path 88 inside the enclosure 22. The upper flighting segment 64 attached to the upper core 48 and the knives 78 attached to the upper flighting segment 64 also follow the circular path 88. The circular path 88 resulting from the angled centerline 50 of the upper core 48 allows the auger 42 and the upper flighting segment 64 to contact a much greater volume of the feed materials F than if the upper core 48 were aligned with the axis of rotation 46.

Figure 5:
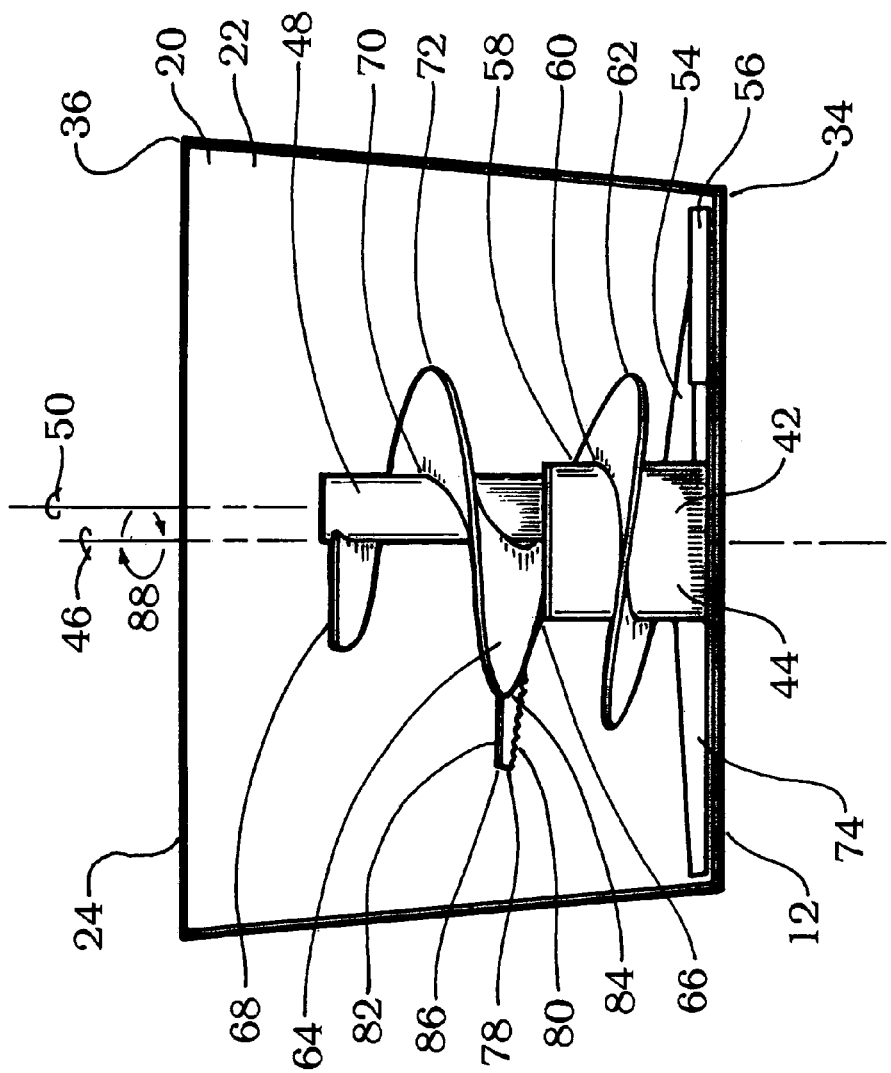
FIG. 5 is a section view of a second non-concentric auger configuration.

In the embodiment shown in FIG. 5, the centerline 50 of the upper core 48 is parallel and spaced offset to the axis of rotation 46 of the lower core 44. As the auger 42 rotates around the axis of rotation 46 in the direction of rotation 52, the top of the upper core 48 will travel in a circular path 88 inside the enclosure 22. The upper flighting segment 64 attached to the upper core 48 and the knives 78 attached to the upper flighting segment 64 also follow the circular path 88. The circular path 88 resulting from the offset centerline 50 of the upper core 48 allows the auger 42 and the upper flighting segment 64 to contact a much greater volume of the feed materials F than if the centerline 50 of the upper core 48 were concentric with the axis of rotation 46.

Figure 6:
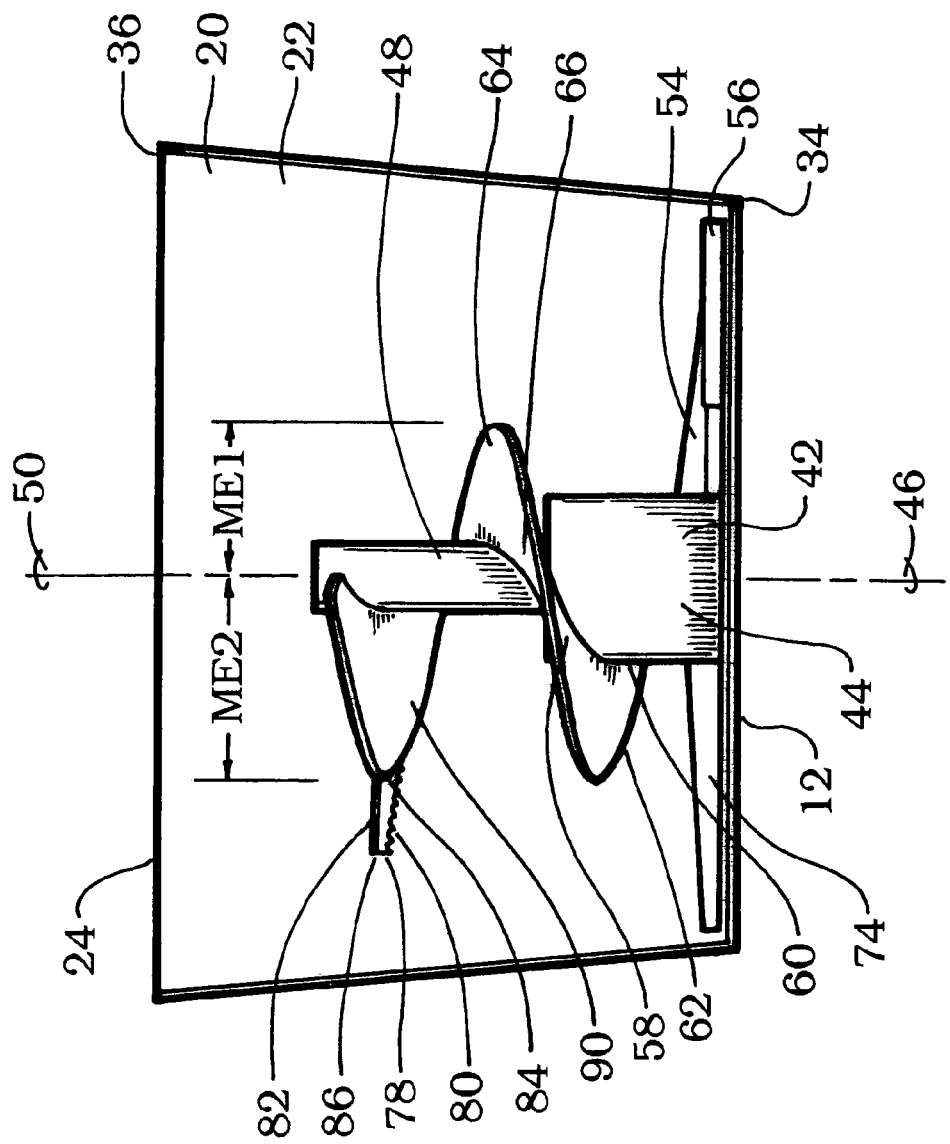
FIG. 6 is a section view of a lobed auger configuration.

In the embodiment shown in FIG. 6, a single core is used that includes an axis of rotation 46. A first flighting segment 64 includes one or more lobes 90 which extend to at least one side of the first flighting segment 64. The lobes 90 cause the first flighting segment 64 to be non-symmetrical to the centerline 50 of the upper core 48. That is, the maximum extent (ME1) of a first portion of the first flighting segment 64 is substantially smaller than a maximum extent (ME2) of a second portion of the first flighting segment 64 that is substantially opposite the first portion. As used herein, substantially smaller is intended to mean that ME1 and ME2 have a difference of greater than 25%, preferably the difference between ME1 and ME2 is in the range of 25% to 75%. Alternatively, a maximum extent of the flighting can be non-monotonic such that, as the maximum extent is viewed along an increasing height, the maximum extent increase and decreases, as opposed to known augers having flights with constant maximum extent or a strictly decreasing maximum extent with increasing height along the auger.

The knives 78 are attached to the lobes 90 at the inner side 84. As the auger 42 rotates in the direction of rotation 52 around the axis of rotation 46, the lobes 90 and knives 78 contact a greater volume of the feed materials F than if the lobes 90 were not present.

In the embodiment shown in FIG. 7A and FIG. 7B, the lower core 44 and upper core 48 are attached by a pair of matching plates including a lower core mounting plate 92 and an upper core mounting plate 94. The core mounting plates 92 and 94 have a plurality of matching fastening holes 96 and are attached by a plurality of fasteners 98. The upper core mounting plate 94 can be rotated and fastened to the lower core mounting plate 92 in several combinations of the matching fastening holes 96 to allow the upper core 48 to tilt in several different directions relative to the lower core 44. The lower core mounting plate 92 in FIG. 7A is shown in a plane perpendicular to the axis of rotation 46. The lower core mounting plate 92 in FIG. 7B is shown mounted at an angle to the axis of rotation 46 to allow a further range of angular adjustment of the upper core mounting plate 94 and thus the upper core 48.

In the embodiment shown in FIG. 8, a core mounting plate shim 100 is shown, with further fastening holes 102 which match the fastening holes 96 in the lower and upper core mounting plates 92 and 94 as shown in FIGS. 7A and 7B. The core mounting plate shim 100 when inserted between the lower and upper core mounting plates 92 and 94 allows a further range of angular adjustment of the upper core mounting plate 94 and thus the upper core 48.

Operation

In the operation of the mixing apparatus (10), feed materials (F) such as hay, forages, and grains are loaded into the mixer through the top opening (24). Often these materials include long stemmed hay, either in square or round bales. The mixer is typically powered by a tractor (not shown), which rotates the auger (42) inside the mixer. The auger 42 is arranged so that when the auger 42 is rotated around the axis of rotation 46 in the direction of rotation 52, the lower flighting segment 54 sweeps the feed materials (F) from the floor 12 upwards toward the upper flighting segment 64. When the feed material (F) reaches the top of the upper flighting segment 64, it begins to fall back into the enclosure 20 for further mixing. The feed material (F) is also carried in a circular motion around the perimeter of the enclosure 22 due to the rotary movement of the auger 42 around the axis of rotation 46 in the direction of rotation 52. The upper core 48 is not concentric with the axis of rotation 46, so the upper flighting segment 64 is closer to the perimeter of the enclosure 22 during at least one portion of the auger rotation. When the upper flighting segment 64 is closer to the enclosure 22, the knives 78 can more efficiently cut and process the feed materials (F). Once the feed materials (F) are thoroughly mixed, the door 40 is opened and the feed material (F) is discharged out of the mixer 10 for distribution to the intended livestock. Alternative mixing apparatus configurations often includes two or more augers inside the enclosure, which function in similar fashion to the operation described herein.

Although the description above contains many specifics, these should not be construed as limiting the scope of the invention but as merely providing illustrations of some of the presently preferred embodiments of this invention. Thus the scope of the invention should be determined by the appended claims and their legal equivalents, rather than by the examples given. From the foregoing, it can be seen that the present invention accomplishes at least all of the stated objectives.

The invention claimed is:

1. A mixing apparatus for mixing livestock feed, said apparatus comprising:
   a container for the reception of feed; said container including,
      a floor,
      a wall extending away from said floor such that substantially all of said wall is disposed above said floor, said wall defining a top opening disposed remote from said floor for the reception therethrough of the feed, the arrangement being such that said floor and said wall define therebetween an enclosure for the feed received through the top opening,
   at least one auger disposed within said enclosure having an upper core and a lower core, said lower core having an axis of rotation extending substantially perpendicular to a plane of the floor,
   said upper core including a centerline positioned longitudinally and centered in said upper core,
   said centerline of said upper core being non-concentric with said axis of rotation.

2. The mixing apparatus of claim 1 wherein said centerline of said upper core is disposed at an angle to said axis of rotation.

3. The mixing apparatus of claim 2 wherein the angle of said upper core is adjustable, so that varying degrees of non-concentricity can be achieved.

4. The mixing apparatus of claim 3 wherein said upper core angle is adjustable using a plate type shim.

5. The mixing apparatus of claim 2 wherein the angle of said upper core comprises a range of 1 to 30 degrees.

6. The mixing apparatus of claim 5 wherein the range comprises 5 to 15 degrees.

7. The mixing apparatus of claim 1 wherein said centerline of said upper core is parallel and offset from said axis of rotation.

8. The mixing apparatus of claim 1, further comprising a paddle connected to said lower core.

9. The mixing apparatus of claim 1, further comprising a lower fighting segment on said lower core and an upper fighting segment on said upper core.

10. The mixing apparatus of claim 9, wherein said lower fighting segment and said upper fighting segment together have a conical shape.

11. The mixing apparatus of claim 1, wherein a distance between an outer edge of fighting on said lower core and said axis of rotation is greater than a distance between an outer edge of fighting on said upper core and said centerline.

12. The mixing apparatus of claim 1, wherein said auger further comprises a knife connected to fighting of at least one of said lower core and upper core.

13. The mixing apparatus of claim 12, wherein said knife has a cutting edge pointing toward a direction of rotation of said auger.

14. The mixing apparatus of claim 1, wherein said upper core is configured to be removably mounted to said lower core.

15. The mixing apparatus of claim 14, wherein, when said upper core is mounted on said lower core, said centerline is perpendicular to said floor.

16. The mixing apparatus of claim 1, further comprising a core mounting plate shim disposed between said upper core and said lower core, wherein said core mounting plate shim is configured such that said centerline is at an angle not perpendicular to said floor.

17. The mixing apparatus of claim 16, wherein said core mounting plate shim is configured such that said angle depends on a coupling position of said core mounting plate shim relative to mounting plates of said cores.

18. The mixing apparatus of claim 1, wherein said centerline is tilted at an angle with said floor other than 90 degrees.

19. The mixing apparatus of claim 1, wherein an angle between said centerline and said axis of rotation varies according to a coupling position of a mounting plate of said upper core relative to a mounting plate of said lower core.

20. The mixing apparatus of claim 1, wherein a diameter of said lower core is greater than a diameter of said upper core.

* * * * *